US011199432B2

(12) United States Patent
Kwun

(10) Patent No.: US 11,199,432 B2
(45) Date of Patent: Dec. 14, 2021

(54) APPARATUS AND METHOD FOR DETECTING SHORTAGE OF COOLING WATER IN VEHICLE

(71) Applicants: HYUNDAI MOTOR COMPANY, Seoul (KR); KIA MOTORS CORPORATION, Seoul (KR)

(72) Inventor: Sun Dong Kwun, Suwon-si (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 327 days.

(21) Appl. No.: 16/174,136

(22) Filed: Oct. 29, 2018

(65) Prior Publication Data

US 2019/0390994 A1    Dec. 26, 2019

(30) Foreign Application Priority Data

Jun. 22, 2018    (KR) .......................... 10-2018-0072200

(51) Int. Cl.
*G01F 22/00*    (2006.01)
*F01P 3/12*    (2006.01)

(52) U.S. Cl.
CPC ................ *G01F 22/00* (2013.01); *F01P 3/12* (2013.01)

(58) Field of Classification Search
CPC ............. F01N 2260/02; F01N 2610/02; F01N 2610/11; F01N 2610/14; F01N 2900/1602; F01N 3/2006; F01N 3/2066; F01P 11/029; F01P 2005/125; F01P 2060/16; F01P 3/12; F04D 13/06; F04D 15/0088; F04D 15/0218; F04D 1/00; G01F 22/00
See application file for complete search history.

(56) References Cited

U.S. PATENT DOCUMENTS

| 2016/0159247 | A1* | 6/2016 | Lee | H01M 8/04029 |
| | | | | 429/437 |
| 2016/0282133 | A1* | 9/2016 | Kumagai | B60R 11/02 |
| 2017/0012310 | A1* | 1/2017 | Han | B60L 58/33 |
| 2017/0314440 | A1* | 11/2017 | Minezawa | B01D 53/9418 |
| 2019/0186853 | A1* | 6/2019 | Jin | F01P 11/18 |

FOREIGN PATENT DOCUMENTS

KR    10-1998-0002693 A    3/1998

OTHER PUBLICATIONS

"Model-Based Product Line Engineering in an Industrial Automotive Context: An Exploratory Case Study"; by Bilic et al.; SPLC '18: Proceedings of the 22nd International Systems and Software Product Line Conference—vol. 2 Sep. 2018 pp. 56-63 (Year: 2018).*

* cited by examiner

Primary Examiner — Roy Y Yi
Assistant Examiner — Geoffrey T Evans
(74) Attorney, Agent, or Firm — Morgan, Lewis & Bockius LLP

(57) ABSTRACT

In a urea injection system of a vehicle, to detect the shortage of the cooling water by using an electric water pump (EWP) to cool a dosing injector during the running of the vehicle engine, the apparatus for detecting shortage of the cooling water in the vehicle includes a urea injector that injects urea into an exhaust pipe of the vehicle, a pump that cools the urea injector, and a controller that applies a reference current to the pump, measures a time taken until a revolutions per minute (RPM) of the pump reaches a reference RPM, and detects the shortage of the cooling water in the pump by comparing the measured time and a reference time.

14 Claims, 7 Drawing Sheets

APPARATUS AND METHOD FOR DETECTING SHORTAGE OF COOLING WATER IN VEHICLE

CROSS-REFERENCE TO RELATED APPLICATION

This application is based on and claims the benefit of priority to Korean Patent Application No. 10-2018-0072200, filed on Jun. 22, 2018, in the Korean Intellectual Property Office, the disclosure of which is incorporated herein in its entirety by reference.

TECHNICAL FIELD

The present disclosure relates to an apparatus and a method for detecting the shortage of the cooling water in a vehicle. More particularly, the present disclosure relates to a urea injection system and a technology of detecting the shortage of the cooling water for cooling a dosing injector in a diesel engine vehicle.

BACKGROUND

Exhaust gas emitted from a diesel engine contains nitrogen oxides (NOx) that cause serious air pollution. To remove the NOx, a diesel oxidation catalyst (DOC), a diesel particulate filter (DFT), and a selective catalyst reduction (SCR) catalyst are sequentially provided on an exhaust pipe of the diesel engine while serving as kinds of exhaust gas after-treatment devices to physically collect and remove particulate matters (PM) from the exhaust gas.

Such an SCR catalyst system is a system to effectively reduce NOx by performing dosing of urea, which serves as a kind of a reduction agent, with respect to the SCR catalyst. The SCR catalyst system reduces the NOx by performing the dosing of urea, which is contained in a urea tank, with respect to the SCR catalyst using a dosing injector (urea injector). In other words, in the SCR catalyst system, the urea injected inside the exhaust pipe is thermally decomposed by the internal heat of the exhaust pipe or is decomposed by making contact with the SCR catalyst. Accordingly, one molecule of urea is converted to two molecules of ammonia. The converted ammonia is used for an SCR reaction with NOx of the exhaust gas. Accordingly, the unharmful nitrogen and water, which are the products of the reaction, are discharged to the outside.

In this case, when the temperature of an engine room is increased, urea is exposed to a high temperature by a conductive heat. Accordingly, urea solid crystals and by-products are made to clog the nozzle of the dosing injector of the urea. As a result, an operating failure, in which the urea is not injected, is caused.

Therefore, the dosing injector has an air cooling structure or a water cooling structure such that the effective cooling function is performed.

The air cooling structure has an advantage in that the air cooling structure is more freely mounted, and the costs are more saved when compared with those of the water cooling structure. However, the air cooling structure has a cooling ability inferior to that of the water cooling structure. The water cooling structure has a cooling ability superior to that of the air cooling structure. However, the water cooling structure is more complex and requires more costs when compared with those of the air cooling structure.

SUMMARY

An aspect of the present disclosure provides an apparatus and a method for detecting the shortage of cooling water in a vehicle, capable of preventing, in advance, a dosing injector from being deteriorated due to the shortage of the cooling water by detecting the shortage of the cooling water using an electric water pump (EWP) for cooling the dosing injector during the operation of a vehicle engine.

According to an aspect of the present disclosure, an apparatus for detecting shortage of the cooling water in a vehicle includes: a urea injector to inject urea into an exhaust pipe of the vehicle; an electric water pump to cool the urea injector; and a controller to apply a reference current to the EWP, to measure a time taken until a revolutions per minute (RPM) of the EWP reaches a reference RPM, and to compare the measured time with a reference time to detect the shortage of the cooling water in the pump.

The controller may determine that the cooling water is insufficient in the EWP when the measured time is not included in a range of the reference time.

The controller may access a vehicle network to collect stage information of a gear shifter and position information of an accelerator pedal.

The controller may apply a reference current to the EWP in a state that the gear shifter is in a neutral stage.

The controller may apply the reference current to the EWP in the state the accelerator pedal is off.

The controller may apply a reference current having a duty cycle of at least 70% to the EWP.

According to the present disclosure, the apparatus may further include a display to display a detection result made by the controller.

According to another aspect of the present disclosure, a method for detecting the shortage of the cooling water in a vehicle includes applying a reference current to an EWP; measuring an RPM of the EWP; measuring an amount of time between a time point at which the reference current is applied to the EWP and a time point at which an RPM of the EWP reaches a reference RPM; and detecting, based on a comparison result between the measured time and the reference time, whether the cooling water is insufficient in the EWP.

The detecting whether the cooling water is insufficient includes: determining that the cooling water is insufficient in the EWP when the measured time is not included in a range of the reference time.

The applying of the reference current includes applying a reference current having a duty cycle of at least 70% to the EWP.

According to the present disclosure, the method may further include displaying a detection result made by the controller.

According to another aspect of the present disclosure, another method for detecting the shortage of a water cooling water in a vehicle, includes: accessing a vehicle network to collect stage information of a gear shifter and position information of an accelerator pedal; applying a reference current to an EWP in a state that the gear shifter is in a neural stage or the accelerator pedal is off; measuring an RPM of the EWP; measuring the time between a time point at which the reference current is applied to the EWP and a time point at which an RPM of the EWP reaches a reference RPM; and detecting, based on a comparison result between the measured time and a reference time, whether the cooling water is insufficient in the EWP.

The detecting whether the cooling water is insufficient includes determining that the cooling water is insufficient in the EWP when the measured time is not included in a range of a reference time.

The applying of the reference current includes applying a reference current having a duty cycle of at least 70% to the EWP.

One aspect provides a method of operating an urea injection system in a vehicle, the method comprises: applying a reference current to a pump that is configured to circulate cooling water; measuring an RPM of the pump; measuring a time between a time point, at which the reference current is applied to the pump, and a time point at which an RPM of the pump reaches a reference RPM; determining, detecting, based on a comparison result between the measured time and a reference time, whether the cooling water is insufficient in the pump; when determined, mixing the cooling water circulating an urea injector cooling system with water from an engine radiator at a mixer.

According to the present disclosure, another method may further include displaying a detection result.

BRIEF DESCRIPTION OF THE DRAWINGS

The above and other aspects, features and advantages of the present disclosure will be more apparent from the following detailed description taken in conjunction with the accompanying drawings.

DETAILED DESCRIPTION

Figure 1:
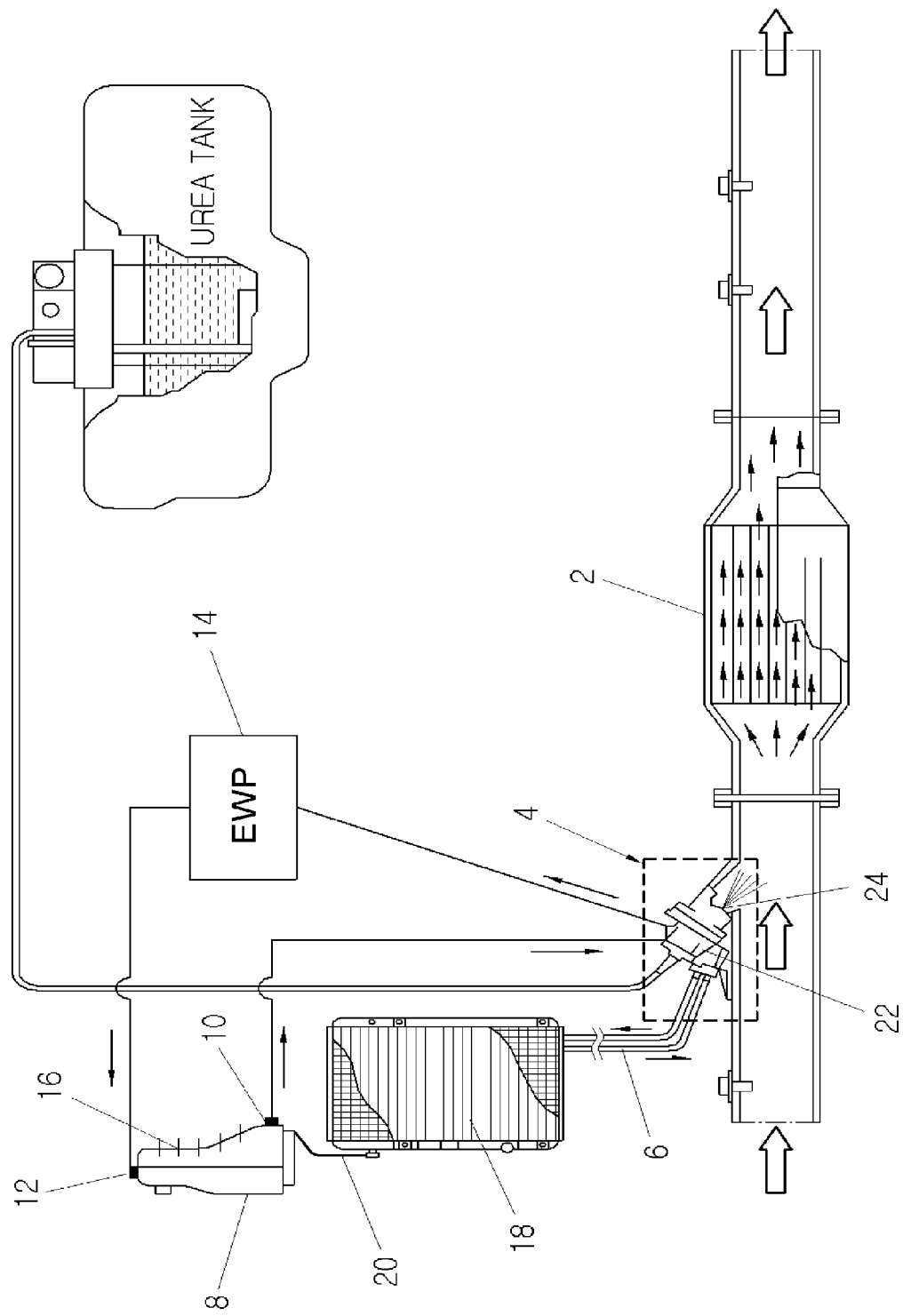
FIG. 1 is a view illustrating a system for cooling a urea dosing injector, to which the present disclosure is applied.

Hereinafter, embodiments of the present disclosure will be described in detail with reference to accompanying drawings. In the following description, the same reference numerals will be assigned to the same components even though the components are illustrated in different drawings. In addition, in the following description of an embodiment of the present disclosure, a detailed description of well-known features or functions will be ruled out in order not to unnecessarily obscure the gist of the present disclosure.

In the following description of components according to an embodiment of the present disclosure, the terms 'first', 'second', 'A', 'B', '(a)', and '(b)' may be used. The terms are used only to distinguish relevant components from other components, and the nature, the order, or the sequence of the relevant components is not limited to the terms. In addition, unless otherwise defined, all terms used herein, including technical or scientific terms, have the same meanings as those generally understood by those skilled in the art to which the present disclosure pertains. Such terms as those defined in a generally used dictionary are to be interpreted as having meanings equal to the contextual meanings in the relevant field of art, and are not to be interpreted as having ideal or excessively formal meanings unless clearly defined as having such in the present application.

A typical water cooling structure has a significant limitation in mounting position thereof and requires an additional pipe for flowing cooling water. In other words, the water cooling structure uses, as coolant, cooling water which is generally provided in an engine room of the vehicle. To supply the cooling water to a urea injector positioned at the rear of the vehicle, the water cooling structure requires many pipes and many water pumps.

An electric water pump to cool a dosing injector may include detection means which is able to detect the shortage phenomenon of the cooling water when an amount of the cooling water is insufficient due to the leakage of a cooling water line.

In an example for detecting the shortage of the cooling water, a water level sensor is installed in a cooling water reservoir tank, the water level of the cooling water reservoir tank is detected through the installed water level sensor, and the shortage state of the cooling water is detected based on the detected water level. However, in this technology, as the number of parts is increased due to the employment of the water level sensor, the costs may be increased. Embodiments provide a urea injection system in which the system can determine if the cooling water is insufficient without using a water level sensor.

FIG. 1 is a view illustrating a system for cooling a urea dosing injector, to which embodiments of the present disclosure is applied. Embodiments of the present disclosure is applicable to the system for cooling the urea dosing injector regardless of whether any one of a scheme of cooling the urea dosing injector by using cooling water in a reservoir tank, a scheme of cooling the urea dosing injector using cooling water inside an engine, and a scheme obtained by combining the two schemes, is applied to the system for cooling the urea dosing injector.

As illustrated in FIG. 1, in embodiments, a vehicle includes a urea injection system for injecting urea in an exhaust pipe 2. The urea injection system includes a system for cooling the urea dosing injector, to which embodiments of the present disclosure is applied, includes a cooling water circulation system. The cooling water circulation system includes a reservoir tank 8 having a cooling water supplying device 10 to supply the cooling water to the urea dosing injector 4 and an cooling water inlet 12 into which the cooling water is introduced from the urea dosing injector 4 and an electric water pump (EWP) 14 for circulating the cooling water of the reservoir tank 8 from the reservoir tank 8 to the urea dosing injector 4, so as to cool the urea dosing injector 4 by supplying cooling water, which is contained in a reservoir tank 8, to the urea dosing injector 4.

The cooling water supplying device 10 is formed lower than the cooling water inlet 12 in the reservoir tank 8. The cooling water in the reservoir tank 8 is supplied to the urea dosing injector 4 by the EWP 14 and then introduced into the reservoir tank 8 again.

The reservoir tank 8 is linked to an overflow pipe 20 of a radiator 18, which is positioned at a lateral side of the radiator 18 in an engine room, and is cooled by driving wind of the vehicle, which is introduced into the engine room.

The reservoir tank 8 has radiation fins 16 installed to face a direction that the vehicle advances to widen the contact area with the driving wind of the vehicle, thereby more enhancing the cooling effect of the reservoir tank 8.

The following description will be made regarding a scheme of operating a device for cooling the urea dosing injector 4.

In embodiments, the operating temperature of the urea dosing injector 4 is first measured. Then, when the operating temperature, which is compared with the limit temperature of the urea dosing injector 4, is lower than a set limit margin temperature, cooling water is blocked from flowing to the urea dosing injector 4 through a cooling water line 6 inside an engine and cooling water is supplied from the reservoir tank 8 to the urea dosing injector 4.

For example, on the assumption that the set limit margin temperature is 30° C. and that the limit temperature of the urea dosing injector 4 is 120° C., when the operating temperature is 90° C. or more, the supply of the cooling water is stopped inside the engine and the cooling water in the reservoir tank 8 having the average temperature of 50° C. is supplied to the urea dosing injector 4 to cool the urea dosing injector 4.

The following description will be made regarding a scheme of cooling the urea dosing injector 4.

In embodiment, after measuring the operating temperature of the urea dosing injector 4, if the operating temperature, which is compared with the limit temperature of the urea dosing injector 4, is lower than the set limit margin temperature, an amount of the cooling water in the reservoir tank 8 is checked.

When the level of the cooling water of the reservoir tank 8 is equal to or greater than a specific water level, the cooling water is stopped being supplied from the inner part of the engine while the cooling water of the reservoir tank 8 is supplied to the urea dosing injector 4. However, when the level of the cooling water of the reservoir tank 8 is less than the specific water level, the supply of the cooling water from the inner part of the engine is maintained while the cooling water of the reservoir tank 8 and the cooling water supplied from the inner part of the engine are mixed. Then, the mixed cooling water is supplied to the urea dosing injector 4.

For example, on the assumption that the set limit margin temperature is 30° C. and the limit temperature of the urea dosing injector 4 is 120° C., when the operating temperature is 90° C. or more, an amount of the cooling water in the reservoir tank 8 is checked.

When the cooling water of the reservoir tank 8 is equal to or greater than the specific water level, the cooling water is stopped being supplied from the inner part of the engine while the cooling water of the reservoir tank 8 is supplied to the urea dosing injector 4. However, when the level of the cooling water of the reservoir tank 8 is less than the specific water level, since the cooling water of the reservoir tank 8 is insufficient, the supply of the cooling water from the inner part of the engine is maintained while the cooling water of the reservoir tank 8 and the cooling water supplied from the inner part of the engine are mixed. Then, the mixed cooling water is supplied to the urea dosing injector 4 to cool the urea dosing injector 4.

The cooling water of the reservoir tank 8 and the cooling water in the inner part of the engine are mixed together in a mixer 22 positioned before the cooling water is introduced into the urea dosing injector 4.

Figure 2:
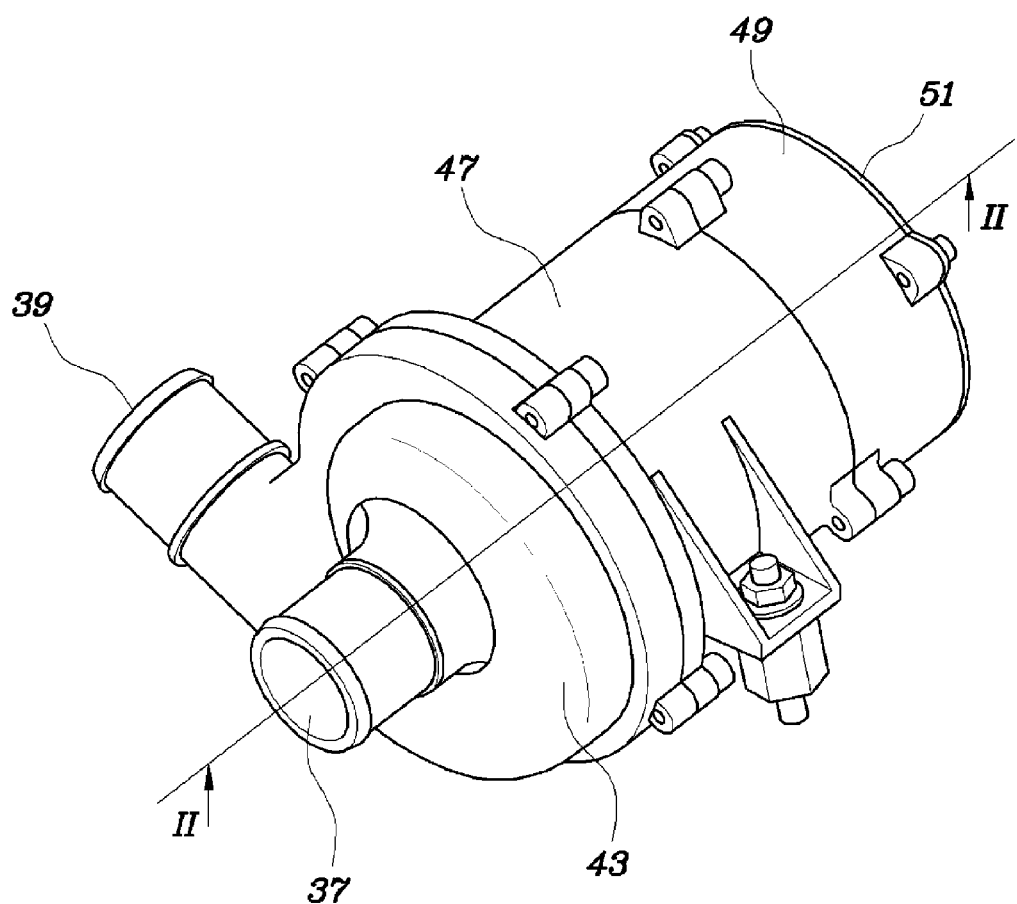
FIG. 2 is a view illustrating an outer appearance of an EWP used in the present disclosure.
Figure 3:
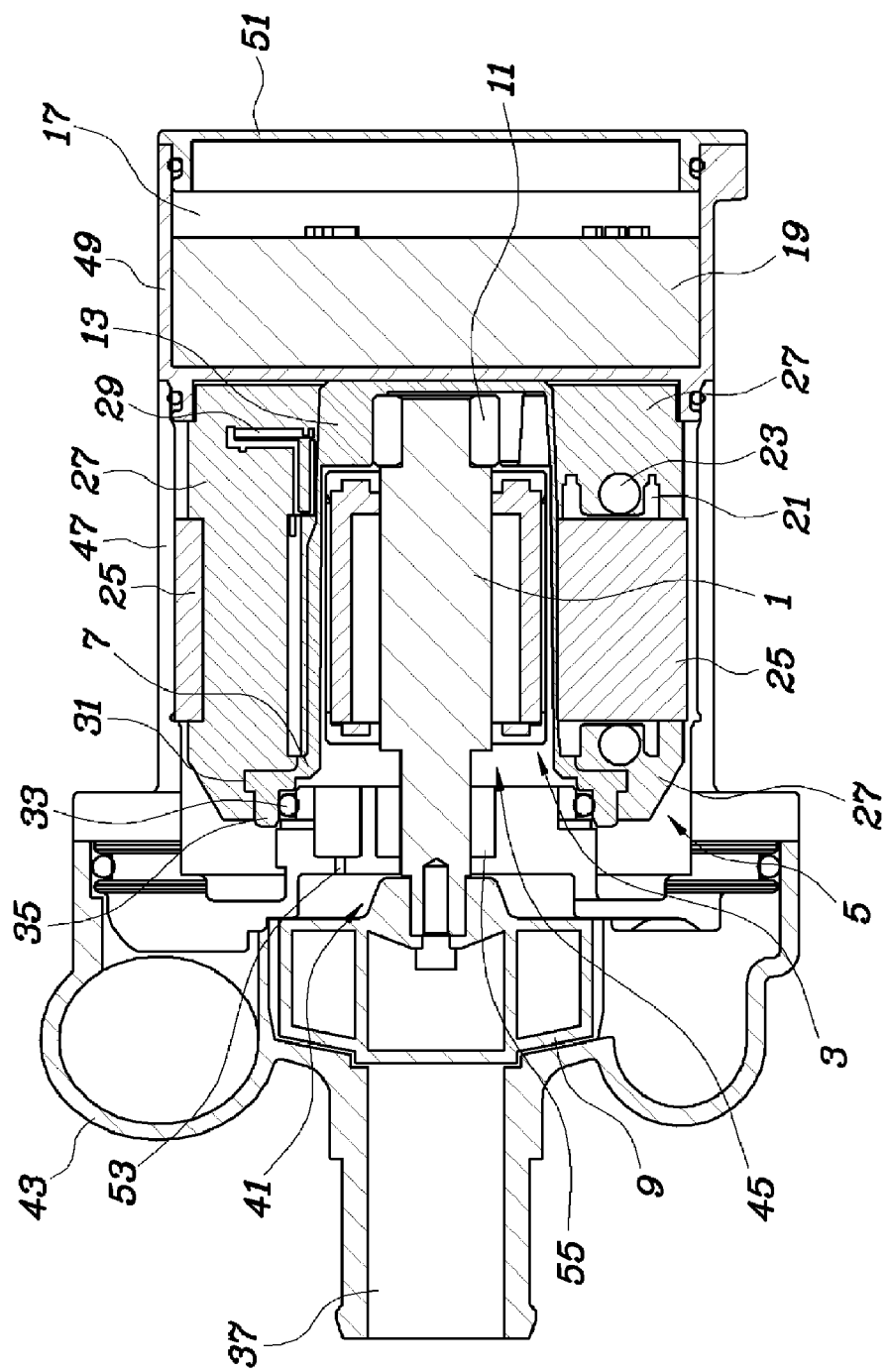
FIG. 3 is a sectional view taken along line II-II of FIG. 1.

Hereinafter, the structure of the EWP 14 according to an embodiment will be described with reference to FIGS. 2 and 3.

In embodiments, the EWP 14 includes a rotation shaft 1, a rotor assembly 3 coupled to an outer circumferential surface of the rotation shaft 1 and rotatably installed in a space for flowing a pumped cooling water, a stator assembly 5 installed to surround the rotator assembly 3 to provide magnetic force used for rotating the rotor assembly 3 by electricity provided from the outside, and a sealing can part 7 having a container form, forming an inner side surface of the stator assembly 5 to define a gap together with an outer circumferential surface of the rotator assembly 3, and fully surrounding the rotor assembly 3 and the rear end portion of the rotation shaft 1 such that the rotator assembly 3 and the rear end portion of the rotation shaft 1 are rotatably supported.

In embodiments, the sealing can part 7 has the shape of a container which constitutes a portion of the stator assembly 5 while fully surrounding the rotor assembly 3 and the rear end portion of the rotation shaft 1 of the rotor assembly 3 such that the rotator assembly 3 and the rear end portion of the rotation shaft 1 are rotatably supported. Accordingly, the cooling water flowing into the inner space of the sealing can part 7, in which the rotor assembly 3 is positioned, is prevented from leaking to the outside, thereby providing more securely water-proof performance.

An impeller 9 is mounted on a front end portion of the rotation shaft 1 to pump the cooling water. The sealing can part 7 is open in a direction of facing a front end portion on which the impeller 9 of the rotation shaft 1 is mounted and is provided in a sealed form to surround a rear end portion which is an opposite side of the front end portion on which the impeller 9 of the rotation shaft 1 is mounted.

A rear bearing 11 is coupled to the rear end portion of the rotation shaft 1 and the sealing can part 7 has a support rib 13 protruding inwardly to support the rear bearing 11. The support rib 13 protrudes while making a step difference from the rear inner surface of the sealing can part 7 to form a cooling water passage 15 between the rear bearing 11 and the rear end portion of the rotation shaft 1 such that the cooling water flows.

Accordingly, the rear end portion of the rotation shaft 1 is fixed into the sealing can part 7 to be rotatable by the rear bearing 11 supported by the support rib 13. In addition, as the cooling water flows in the rear bearing 11 and the rear portion of the rotation shaft 1 through the cooling water passage 15, the rear bearing 11 and the rear portion of the rotation shaft 1 are cooled. In addition, as the cooling water has the buffer action, the support part of the support rib 13 may be prevented from being broken due to the rotation vibration of the rotation shaft 1. In addition, a driver 19 provided in a driver space 17 to be described may be cooled.

The stator assembly 5 includes a plurality of insulators 21 positioned outside the sealing can part 7, a coil 23 wound around the insulators 21, and a stator core 25 fixing the insulators 21. The sealing can part 7 is provided at an outside thereof with a bulk mold compound (BMC) case 17 to be high-pressure injection compression molded in the state that the insulator 21, the coil 23, and the stator core 25 are fixed, to be integrated with the sealing can part 7, the insulator 21, the coil 23, and the stator core 25.

Meanwhile, the sealing can part 7 is formed through injection molding using polyphenylene sulfide (PPS) which is a kind of engineering plastic.

In embodiments, the stator assembly 5 is formed by primarily injection-molding the sealing can part 7, and performing double-injection molding using thee BMC which is a composite raw material including a potassium-based material which is a low profile agent in the state that the insulator 21, the coil 23, and the stator core 25 are fixed to the outside of the sealing can part 7.

When the stator assembly 5 is formed through the double-injection molding, the stator assembly 5 may be formed in the state that there is absent an air layer to be produced inside the stator assembly 5 through the combination of mutually different materials and parts, thereby preventing the efficiency of the motor from being degraded to improve the performance of the motor and to help the uniform improvement of the motor performance.

In addition, since the BMC material represents an excellent heat dissipation characteristic, the shape of the sealing can part 7, the fully moisture-proof and waterproof functions made by the PPS material, and the smooth heat dissipation characteristic by the BMC case 27 significantly improve the operating reliability of the EWP.

Meanwhile, in some embodiments, a hall sensor substrate 19 having a hall sensor to sense the rotation of the rotor assembly 3 is inserted into the BMC case 27 and integrated with the BMC case 27.

The sealing can part 7 is formed on a front end portion thereof with a protrusion locking step 31 to radially protrude outward from the front end portion, and to be inserted into the BMC case 27 to enhance coupling force. A sealing coupling step 35 is formed to protrude forward from the protrusion locking step 31 and has an inner circumferential surface to pressing-support the sealing material 33, thereby sealing and blocking an inner part and an outer part of the sealing can part 7.

Accordingly, the sealing can part 7 is more tightly and securely integrated with the BMC case 27 by the protrusion locking step 31.

Meanwhile, there are provided a pump cover 43 including an inlet 37 into which the cooling water is introduced, an outlet 39 from which the cooling water is discharged, and a pumping space 41 in which an impeller 9 is rotated, a body cover 47, which is coupled to the pump cover 43 to form the pumping space 41 and to form a motor space 45 provided therein with a motor separately from the pumping space 41 and used for installing the stator assembly 5 and the rotor assembly 3, a driver case 49, which is coupled to the body cover 47 to form the motor space 45 and to form a driver space 17 to be provided therein with the driver 19 to control the motor separately from the motor space 45, and a driver cover 51 to seal the driver case 49.

In addition, the EWP 14 includes the rotation shaft 1, the impeller 9 mounted on the front end portion of the rotation shaft 1 to pump the cooling water, the rotor assembly 3 coupled to the outer circumferential surface of the rotation shaft 1 and rotatably installed in a space allowing the pumped cooling water to flow, the stator assembly 5 installed to surround the rotor assembly 3 and to provide magnetic force for rotating the rotor assembly 3 by electricity provided from the outside, and the sealing can part 7 forming the inner side surface of the stator assembly 5 to form a gap with the outer circumferential surface of the rotor assembly 3, fully surrounding and rotatably supporting the rotor assembly 3 and the rear end portion of the rotation shaft 1, and open in the direction of facing a front end portion on which the impeller 9 of the rotation shaft 1 is mounted, and provided in a sealed form to surround the rear end portion which is the opposite side of the front end portion on which the impeller 9 of the rotation shaft 1 is mounted.

The EWP 14 to supply the cooling water to the urea dosing injector 4 generally operates after the engine of the vehicle is stopped, thereby preventing the urea dosing injector 4 from being deteriorated.

Actually, even after the engine is stopped, the heat of the engine is transferred to the urea dosing injector 4 to increase the temperature of the urea dosing injector 4. Accordingly, in embodiments, the EWP 14 may be operated even after the engine is stopped.

However, when the cooling water is insufficient, no matter how the EWP 14 operates, the urea dosing injector 4 may not be cooled. Accordingly, embodiments of the invention provide a scheme of determining whether the cooling water is insufficient. In the following description, the scheme will be described in detail.

Figure 4:
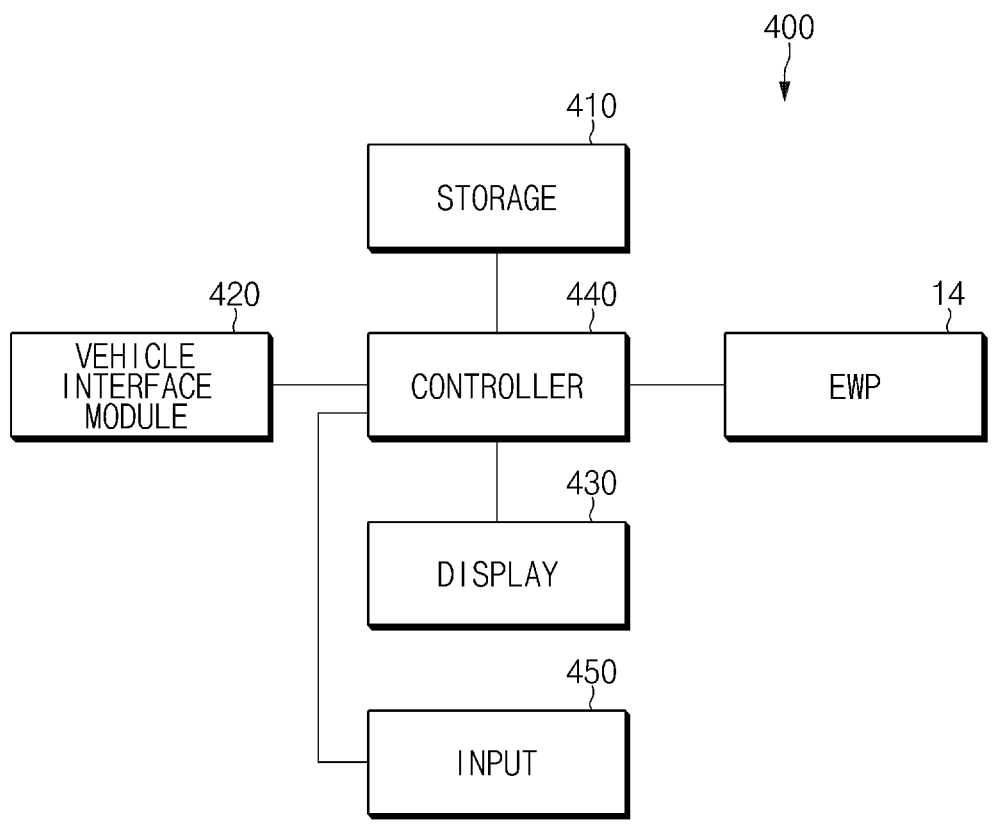
FIG. 4 is a block diagram illustrating an apparatus for detecting the shortage of the cooling water in a vehicle, according to an embodiment of the present disclosure.

FIG. 4 is a block diagram illustrating an apparatus for detecting the shortage of the cooling water in a vehicle, according to an embodiment of the present disclosure.

As illustrated in FIG. 4, according to embodiments of the present disclosure, an apparatus 400 for detecting shortage of the cooling water in a vehicle may include a storage 410, a vehicle interface module 420, a display 430, a controller 440, and an input 450. Depending on a scheme of reproducing embodiments of the present disclosure, components are coupled to each other to be unified in one component. In addition, some components may be omitted depending on the scheme of reproducing embodiments of the present disclosure In embodiments, the storage 410 stores reference data used to determine whether the cooling water is insufficient. In embodiments, the storage 410 stores a reference time taken to a reference RPM corresponding to a reference current. In embodiments, the reference current is a current to maximize the driving of the EWP 14 and preferably has a duty cycle of at least 70%. This is because the influence of noise is increased when the duty cycle is less than 70% (signal discrimination is gradually difficult). The reference time may refer to correct time or may refer to a specific time range.

The storage 410 may store data for supporting various functions performed by the apparatus 400 for detecting the shortage of the cooling water in the vehicle.

The storage 410 may store a program for operating the controller 440 and may temporarily store input/output data.

The storage 410 may store information on the specification and the performance of the EWP 14 mounted on the vehicle.

The storage 410 may include a storage medium of at least one of a flash memory type, a hard disk type, a solid state disk type, a silicon disk drive type, a multimedia card micro type, a card-type memory (e.g., an SD memory or an XD memory, a random access memory (RAM), a static random access memory (SRAM), a read-only Memory (ROM), an electrically erasable programmable read-only memory (EE-PROM), a programmable read-only memory (PROM), a magnetic memory, a magnetic disk and an optical disk.

The vehicle interface module 420 is a module to access a vehicle network and to provide a network accessing interface. In embodiments, the vehicle network includes a controller area network (CAN), a local interconnect network (LIN), FlexRay, a media oriented systems transport (MOST), or the like.

Next, the display 430 may be implemented in the form of a cluster and may provide various pieces of information for a driver. In particular, the display 430 may display that the shortage of the cooling water occurs under the control of the controller 440. In embodiments, the cluster may be digitally implemented. In embodiments, the digital cluster may display vehicle information and driving information in the form of an image and may display a distance to empty (DTE) of a vehicle, which is calculated based on a battery charge. In addition, the cluster may include a tachometer, a speedometer, a cooling water thermometer, a redirection indicator, a high beam indicator light, a warning light, a seat belt warning light, an odometer, an odometry, an automatic shift selector lever, a door open warning light, an engine oil warning light, and a lower battery light.

The display 430 may be implemented as a display of an audio video navigation (AVN) system.

The display 430 may sense a proximity touch within a display window through a proximity sensor. For example, the display 430 detects the position of the proximity touch when the proximity touch is performed with respect to the pointer (e.g., the finger or the stylus pen) and outputs position information corresponding to the detected position to the controller 440.

According to embodiments of the present disclosure, a warning device may be further included to warn the shortage of the cooling water through sound.

Next, the controller 440 performs the overall control such that the components normally perform the intrinsic functions of the components. In addition, the controller 440 may be implemented in the form of hardware or software, and may be present in the form of the combination of the hardware and the software. Preferably, the controller 440 may be implemented in the form of a micro-processor, but the present disclosure is not limited thereto.

For example, the controller 440 applies a reference current having the duty cycle of at least 70% to the EWP 14, measures the elapsed time taken until the RPM of the EWP 14 reaches the reference RPM, and detects or determines the shortage of the cooling water in the EWP 14 based on the elapsed time, for example, through the comparison between the measured elapsed time and the reference time.

The controller 440 does not determine that the cooling water is insufficient in the EWP 14 if the measured time satisfies the reference time. If the measured time does not satisfy the reference time (usually, the measured time is less than the reference time), the controller 440 determines that the cooling water is insufficient in the EWP 14.

In embodiments, the controller 440 may normally detect or determine whether the cooling water is insufficient in the EWP 14 only using the above function since the shortage of the cooling water is detected without the influence or interference by a torque of an engine in the state that the engine of the vehicle is stopped.

However, in embodiments, the controller 440 may obtain an accurate detection result when detecting or determining the shortage of the cooling water in the EWP 14 at the time point that the influence by the torque of the engine is not exerted in the case that the engine of the vehicle is operating (the case that the vehicle is running).

Therefore, according to embodiments of the present disclosure, the more accurate detection result may be obtained when the shortage of the cooling water in the EWP 14 is detected in an idle state of an engine (the gear shifter is in the neutral (N) state), in the state that an accelerator pedal is off (the state that the driver does not step on the accelerator pedal), or at a time point after a threshold time (for example one second) is elapsed from that the driver takes the foot of the driver off the accelerator pedal.

Based on the above fact, the controller 440 applies a reference current having the duty cycle of at least 70% to the EWP 14, measures the time taken until the RPM of the EWP 14 reaches the reference RPM, and detects whether the shortage of the cooling water in the EWP 14 through the comparison between the measured time and the reference time, in the state that the gear shifter is in a neutral stage or the accelerator pedal is off.

Meanwhile, the controller 440 is activated depending on user settings (for example, switch-on through the handling of a user) through the input 450 to perform the procedure of detecting the shortage of the cooling water.

The controller 440 may access a vehicle network through the vehicle interface module 420 to collect various pieces of vehicle data. In embodiments, the controller 440 may collect, for example, the operating state of the engine of the vehicle, the speed of the vehicle, the pressing degree of the accelerator pedal (Accelerator position sensor; APS), an RPM of the engine, the torque of the engine, the over-run state of the engine, gear-shift stages (N, R, and D), and a clutch-coupling state. In embodiments, the controller 440 may selectively collect only necessary information depending on situations.

Figure 5:
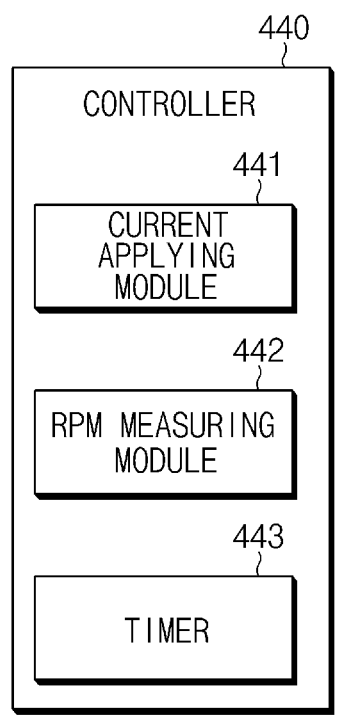
FIG. 5 is a block diagram illustrating a controller of the apparatus for detecting the shortage of the cooling water in the vehicle, according to the present disclosure.

FIG. 5 is a block diagram illustrating a controller of the apparatus for detecting the shortage of the cooling water in the vehicle, according to embodiments of the present disclosure.

As illustrated in FIG. 5, in embodiments, the controller 440 may include a current applying module 441, an RPM measuring module 442, and a timer 443.

The current applying module 441 may apply a reference current to the EWP 14 based on a battery mounted in the vehicle.

The RPM measuring module 442 may measure the RPM of the EWP 14. For example, the RPM measuring module 442 may measure the RPM of the EWP 14 using a hall sensor.

The timer 443 measures the time between a time point at which the reference current is applied to the EWP 14 and a time point at which the RPM of the EWP 14 reaches the reference RPM.

Figure 6:
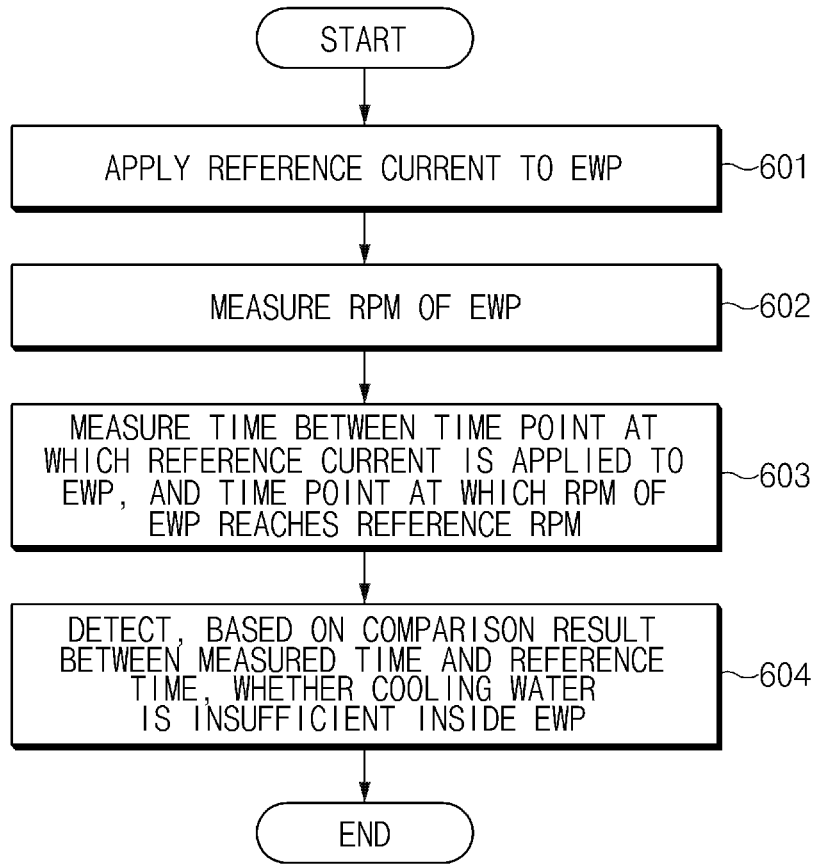
FIG. 6 is a flowchart illustrating a method for detecting the shortage of the cooling water in a vehicle, according to an embodiment of an embodiment of the present disclosure.

FIG. 6 is a flowchart illustrating a method for detecting the shortage of the cooling water in a vehicle, according to an embodiment of the present disclosure. FIG. 6 illustrates the procedure of detecting the shortage of the cooling water in the vehicle while the engine is being stopped. Since the influence by the engine is not exerted while the engine of the vehicle is being stopped, the shortage of the cooling water in the EWP 14 may check depending on the settings of the user through the input 450.

First, the controller 440 applies the reference current to the EWP 14 (601). In embodiments, the reference current is a current applied with a specific level at the duty cycle of at least 70%.

Thereafter, the controller 440 measures the RPM of the EWP 14 (602).

Thereafter, the controller 440 measures the elapsed time between the time point at which the reference current is applied to the EWP 14 and the time point at which the RPM of the EWP 14 reaches the reference RPM (603).

Thereafter, the controller 440 detects whether the cooling water is insufficient in the EWP 14, based the comparison result between the measured time and the reference time (604). The controller 440 does not determine that the cooling water is insufficient in the EWP 14 if the measured time satisfies the reference time. If the measured time does not satisfy the reference time (if the measured time is less than the reference time), the controller 440 determines that the cooling water is insufficient in the EWP 14.

Through the above scheme, embodiments of the present disclosure have an advantage of detecting the shortage of the cooling water in the EWP 14, by using the EWP 14 mounted on the vehicle.

Figure 7:
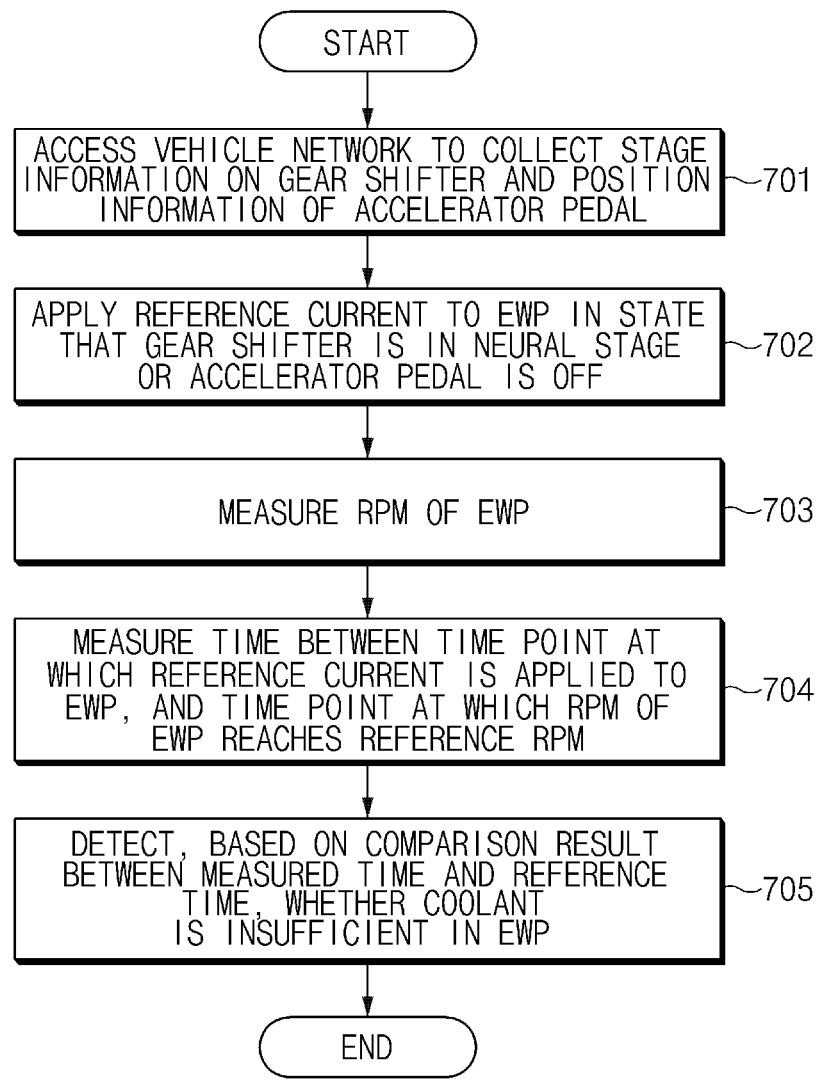
FIG. 7 is a flowchart illustrating a method for detecting the shortage of the cooling water in a vehicle, according to another embodiment of the present disclosure.

FIG. 7 is a flowchart illustrating a method for detecting the shortage of the cooling water in a vehicle, according to another embodiment of the present disclosure. FIG. 7 illustrates the procedure of detecting the shortage of the cooling water in the vehicle while the vehicle is driving. Since the influence by the torque of the engine is exerted while the engine of the vehicle is running, in embodiments, it may be necessary to limit a detection time point to detect the shortage of the cooling water more accurately. The configuration of limiting the detection time point is one of features of the present disclosure.

The controller 440 accesses a vehicle network through the vehicle interface module 420 to collect stage information on a gear shifter and position information of an accelerator pedal (701). In embodiments, this collecting procedure is made in the state that the user settings are received through the input 450.

Thereafter, the controller 440 applies the reference current to the EWP 14 in the state that the gear shifter is in the neutral stage or the accelerator pedal is off (702). In embodiments, the reference current is a current applied with a specific level at the duty cycle of at least 70%.

Thereafter, the controller 440 measures the RPM of the EWP 14 (703).

Thereafter, the controller 440 measures the time between a time point at which a reference current is applied to the EWP 14, and a time point at which the RPM of the EWP 14 reaches a reference RPM (704).

Thereafter, the controller 440 detects or determines whether the cooling water is insufficient in the EWP 14, based the comparison result between the measured time and the reference time (705). The controller 440 does not determine that the cooling water is insufficient in the EWP 14 if the measured time satisfies the reference time. If the measured time does not satisfy the reference time (if the measured time is less than the reference time), the controller 440 determines that the cooling water is insufficient in the EWP 14.

Through the above scheme, embodiments of the present disclosure have an advantage of detecting the shortage of the cooling water in the EWP 14, by using the EWP 14 mounted on the vehicle even if the vehicle is running.

As described above, according to embodiments of the present invention, the dosing injector may be, in advance, prevented from being deteriorated due to the shortage of the cooling water by detecting the shortage of the cooling water using the electric water pump (EWP) for cooling the dosing injector during the operation of the vehicle engine.

Logical blocks, modules or units described in connection with embodiments disclosed herein can be implemented or performed by a computing device having at least one processor, at least one memory and at least one communication interface. The elements of a method, process, or algorithm described in connection with embodiments disclosed herein can be embodied directly in hardware, in a software module executed by at least one processor, or in a combination of the two. Computer-executable instructions for implementing a method, process, or algorithm described in connection with embodiments disclosed herein can be stored in a non-transitory computer readable storage medium.

Hereinabove, although embodiments of the present disclosure have been described with reference to the accompanying drawings, the present disclosure is not limited thereto, but may be variously modified and altered by those skilled in the art to which the present disclosure pertains without departing from the spirit and scope of the present disclosure claimed in the following claims.

Therefore, embodiments of the present disclosure are not intended to limit the technical spirit of the present disclosure, but provided only for the illustrative purpose. The scope of protection of the present disclosure should be construed by the attached claims, and all equivalents thereof should be construed as being included within the scope of the present disclosure.

What is claimed is:

1. An apparatus for urea injection in a vehicle, the apparatus comprising:
   a urea injector configured to inject urea into an exhaust pipe of the vehicle;
   a pump configured to circulate cooling water for cooling the urea injector using the cooling water; and
   a controller configured to apply a reference current to the pump, measure a time taken until a revolutions per minute (RPM) of the pump reaches a reference RPM, and determine the shortage of the cooling water in the pump based on the measured time and a reference time,
   wherein the controller is configured to determine that the cooling water is insufficient in the pump when the measured time is not within a range preset based on the reference time.

2. The apparatus of claim 1, wherein the controller is configured to access a vehicle network to collect stage information of a gear shifter and position information of an accelerator pedal.

3. The apparatus of claim 2, wherein the vehicle network includes at least one selected from the group consisting of a controller area network (CAN), a local interconnect network (LIN), FlexRay, and a media oriented system transport (MOST).

4. The apparatus of claim 1, wherein the controller is configured to access a vehicle network to collect stage information of a gear shifter, and further configured to apply the reference current to the pump in a state that the gear shifter is in a neutral stage.

5. The apparatus of claim 1, wherein the controller is configured to access a vehicle network to collect stage information of an accelerator pedal, and further configured to apply the reference current to the pump in a state that the accelerator pedal is off.

6. The apparatus of claim 1, wherein the controller is configured to apply a reference current having a duty cycle of at least 70% to the pump.

7. The apparatus of claim 1, further comprising:
   a display to display a determination result of the controller.

8. A method of detecting shortage of cooling water in a vehicle, the method comprising:
   applying a reference current to a pump that is configured to circulate cooling water;
   measuring an RPM of the pump;
   measuring a time between a time point, at which the reference current is applied to the pump, and a time point at which an RPM of the pump reaches a reference RPM; and
   determining, based on a comparison result between the measured time and a reference time, whether the cooling water is insufficient in the pump,
   wherein the determining whether the cooling water is insufficient includes:
   determining that the cooling water is insufficient in the pump when the measured time is not within a range preset based on the reference time.

9. The method of claim 8, wherein the applying of the reference current includes:

applying, to the pump, a reference current having a duty cycle of at least 70%.

10. The method of claim 8, further comprising:
displaying a determined result.

11. A method of detecting shortage of cooling water in a vehicle, the method comprising:
- accessing a vehicle network to collect stage information of a gear shifter and position information of an accelerator pedal;
- applying a reference current to a pump in a state that the gear shifter is in a neutral stage or the accelerator pedal is off;
- measuring an RPM of the pump;
- measuring a time between a time point at which the reference current is applied to the pump and a time point at which an RPM of the pump reaches a reference RPM; and
- determining, based on a comparison result between the measured time and a reference time, whether the cooling water is insufficient in the pump,
wherein the determining whether the cooling water is insufficient includes:
- determining that the cooling water is insufficient in the pump when the measured time is not within a range preset based on the reference time.

12. The method of claim 11, wherein the applying of the reference current includes:
applying a reference current having a duty cycle of at least 70% to the pump.

13. The method of claim 11, wherein the vehicle network includes:
at least one selected from the group consisting of a CAN, a LIN, FlexRay, and a MOST.

14. The method of claim 11, further comprising:
displaying a determined result.

* * * * *